(12) United States Patent
Wang et al.

(10) Patent No.: US 10,946,356 B2
(45) Date of Patent: Mar. 16, 2021

(54) GAS GENERATOR AND METHOD OF GENERATING A GAS

(71) Applicant: TEMASEK POLYTECHNIC, Singapore (SG)

(72) Inventors: Lei Wang, Singapore (SG); Ming Han, Singapore (SG); Yunzhong Chen, Singapore (SG)

(73) Assignee: TEMASEK POLYTECHNIC, Singapore (SG)

( * ) Notice: Subject to any disclaimer, the term of this patent is extended or adjusted under 35 U.S.C. 154(b) by 113 days.

(21) Appl. No.: 16/075,150

(22) PCT Filed: Feb. 6, 2017

(86) PCT No.: PCT/SG2017/050053
§ 371 (c)(1),
(2) Date: Aug. 3, 2018

(87) PCT Pub. No.: WO2017/135900
PCT Pub. Date: Aug. 10, 2017

(65) Prior Publication Data
US 2019/0039037 A1    Feb. 7, 2019

(30) Foreign Application Priority Data
Feb. 5, 2016   (SG) .............................. 10201600944S

(51) Int. Cl.
*B01J 7/02* (2006.01)
*C01B 13/02* (2006.01)
*C01B 3/06* (2006.01)
*C01B 3/08* (2006.01)

(52) U.S. Cl.
CPC ................. *B01J 7/02* (2013.01); *C01B 3/065* (2013.01); *C01B 3/08* (2013.01); *C01B 13/0203* (2013.01); *Y02E 60/36* (2013.01)

(58) Field of Classification Search
CPC combination set(s) only.
See application file for complete search history.

(56) References Cited

U.S. PATENT DOCUMENTS

| 3,864,927 A | * | 2/1975 | Li | ........................... F25J 1/0022 |
| | | | | 62/54.3 |
| 4,155,712 A | * | 5/1979 | Taschek | ..................... B01J 7/02 |
| | | | | 422/239 |
| 2007/0189940 A1 | | 8/2007 | Shurtleff et al. | |
| 2011/0070151 A1 | | 3/2011 | Braithwaite et al. | |

(Continued)

FOREIGN PATENT DOCUMENTS

WO   2015065289 A1   5/2015

*Primary Examiner* — Kaity V Chandler
(74) *Attorney, Agent, or Firm* — Horizon IP Pte Ltd.

(57) ABSTRACT

A gas generator and a method of generating a gas are provided. A gas generator includes a cartridge having a solid reactant and a liquid reactant distributor provided therein, and a liquid reactant supply in fluid communication with the liquid reactant distributor. The liquid reactant supply is configured to provide a liquid reactant under pressure to the liquid reactant distributor. The liquid reactant distributor comprises a plurality of normally closed holes configured to open at a predetermined fluid pressure to disperse the liquid reactant for reaction with the solid reactant in the cartridge.

15 Claims, 6 Drawing Sheets

(56) References Cited

U.S. PATENT DOCUMENTS

| | | | |
|---|---|---|---|
| 2011/0194992 A1* | 8/2011 | Barton | C01B 3/02 |
| | | | 422/239 |
| 2011/0200495 A1* | 8/2011 | Braithwaite | C01B 3/02 |
| | | | 422/242 |
| 2012/0269694 A1* | 10/2012 | Zheng | H01M 8/065 |
| | | | 422/187 |
| 2013/0028809 A1* | 1/2013 | Barton | B01J 7/02 |
| | | | 422/187 |
| 2013/0074757 A1* | 3/2013 | McAlister | B63B 35/4413 |
| | | | 114/264 |
| 2013/0230784 A1* | 9/2013 | Wallace | H01M 8/04216 |
| | | | 429/421 |
| 2013/0295002 A1* | 11/2013 | Marsh | C01B 3/065 |
| | | | 423/579 |
| 2014/0050625 A1 | 2/2014 | Zheng et al. | |
| 2014/0056772 A1* | 2/2014 | Stimits | C01B 3/065 |
| | | | 422/162 |
| 2015/0340718 A1* | 11/2015 | Barton | C01B 3/04 |
| | | | 422/114 |
| 2016/0023897 A1* | 1/2016 | Gu | H01M 8/04776 |
| | | | 429/421 |
| 2016/0045841 A1* | 2/2016 | Kaplan | B01D 3/06 |
| | | | 429/49 |
| 2016/0346758 A1* | 12/2016 | Kress | C10G 31/10 |
| 2017/0183227 A1* | 6/2017 | Finnerty | B01J 19/0013 |

\* cited by examiner

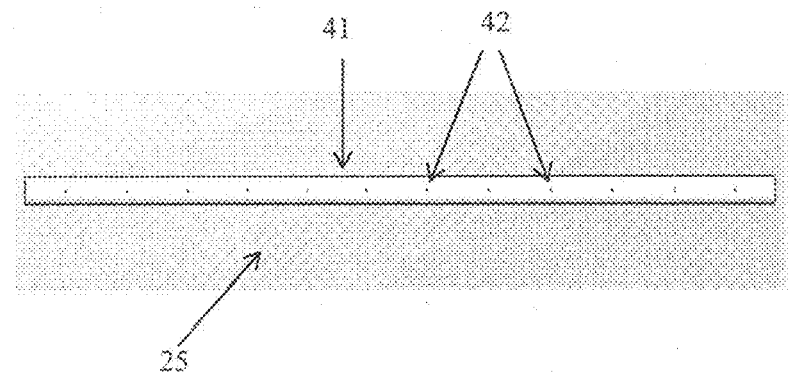
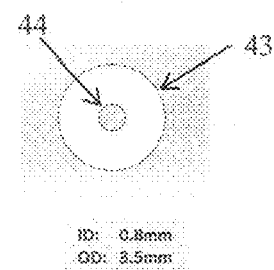
FIG. 4A
FIG. 4B
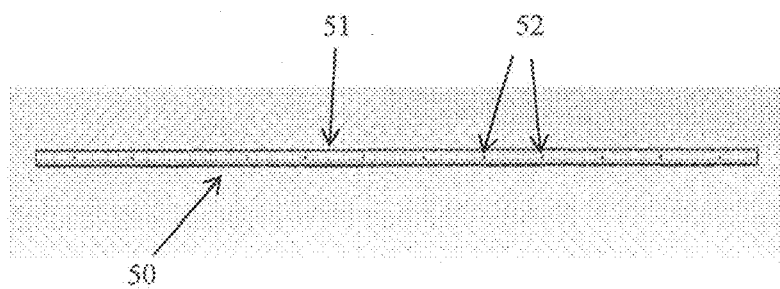
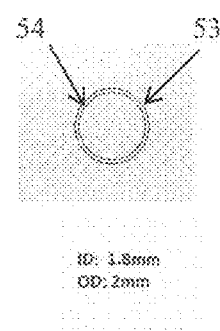
FIG. 5A
(Prior Art)
FIG. 5B
(Prior Art)

GAS GENERATOR AND METHOD OF GENERATING A GAS

TECHNICAL FIELD

The present invention relates to a gas generator. More particularly, the present invention relates to a device that is capable of generating gas/gases through a reaction between at least one solid reactant and at least one liquid reactant in a controllable manner.

BACKGROUND ART

On-site gases generation is widely used in various industries, civil or military applications. One obvious advantage is that it eliminates the high pressures involved in bulky compressed gas cylinder. Other advantages include tailorable size and configuration to cater specific requirements, flexibility to be integrated into other systems, and so on.

One example is an emergency oxygen generating system used in airplanes, where a mixture of chlorates & perchlorates, or sometimes urea hydrogen peroxide (UHP) and water are used to generate oxygen on demand.

Another example is a hydrogen generating system described in PCT/SG2014/000505 where hydrogen is generated on-site through a hydrolysis reaction between a solid fuel and a liquid reactant (water, in this case). The concept is that water from the tank is pumped through a circuit tube and sprayed through a liquid distributor into the solid fuel that is stored in a cartridge to incur a hydrolysis reaction. Hydrogen generated passing through the semipermeable cartridge wall is collected in the buffer space before being conducted out for usage. The said buffer space is actually formed by a reactor chamber where the said solid reactant cartridge is housed in. The byproduct and unreacted reactants are constrained in the cartridge for replacement.

Evenly mixing of the liquid and the solid reactants obviously benefit to the reaction speed, gas generation efficiency and restraining undesirable side reactions. Thus, for the liquid reactant spraying out, it is preferred in mist to in droplet.

In addition, proper measure is needed to cut off the liquid reactant spraying promptly, otherwise, residual liquid reactant in the circuit tube and distributor can still reach the solid fuel even if the pump is switched off and thus compromising the controllability of the gas generation process. It is desirable to have a simple distributor design that can cut the liquid reactant spray immediately and thus stop gas generation promptly.

Other desirable improvements include simplifying the solid reactant cartridge design and thus providing some kind of flexibility for easy installation while cutting the weight and cost of the replaceable cartridge.

Therefore, it is desirable to provide a more controllable gas generator with simplified flexible solid reactant cartridge and/or advanced liquid reactant distribution measure where the liquid reactant is sprayed out in mist instead of droplet and the spraying can be cut out promptly.

Accordingly, what is needed is a gas generator that seeks to address some of the above problems. Furthermore, other desirable features and characteristics will become apparent from the subsequent detailed description and the appended claims, taken in conjunction with the accompanying drawings and this background of the disclosure.

SUMMARY OF INVENTION

A first aspect of the present invention provides a gas generator. The gas generator comprises a cartridge having a solid reactant and a liquid reactant distributor provided therein, and a liquid reactant supply in fluid communication with the liquid reactant distributor and configured to provide a liquid reactant under pressure to the liquid reactant distributor. The liquid reactant distributor comprises a plurality of normally closed holes configured to open at a predetermined fluid pressure to disperse the liquid reactant for reaction with the solid reactant in the cartridge.

The plurality of holes may be configured to disperse the liquid reactant in a mist form above the predetermined fluid pressure.

The predetermined fluid pressure may be between 2 to 10 bar, preferably 4 bar.

The cartridge may comprise a cylinder and the liquid reactant distributor runs substantially between two ends of the cartridge through a central axis of the cylinder.

The plurality of normally closed holes may be distributed around and along a length of the liquid reactant distributor.

The liquid reactant distributor may comprise a flexural material configured to allow the plurality of normally closed holes to open at the predetermined fluid pressure.

The flexural material may be selected from a group comprising elastomer, saturated rubbers, unsaturated rubbers, silicone rubber or a combination of these materials.

The liquid reactant distributor may comprise an outer diameter to inner diameter ratio of between 10:1 to 2:1.

A wall thickness of the liquid reactant distributor may be between 0.5 to 2.5 mm.

The gas generator may further comprise a reactor configured to house the cartridge. The reactor may define a chamber for collecting and buffering gas generated in the cartridge.

The reactor may comprise a housing for receiving the cartridge, the housing having an open end and a closed end, a lid for fastening to the open end of the housing and a barbed fitting located in the centre of the lid.

The cartridge may comprise a hydrophobic semipermeable material wrapped around a peripheral surface of the cartridge, wherein the hydrophobic semipermeable material is configured to allow gas to pass through the material while preventing liquid or solid materials from passing through the material.

The hydrophobic semipermeable material may comprise a plurality of micro-pores. Each of the plurality of micro-pores may comprise a diameter of between 0.03 μm to 2 μm.

The cartridge may be additively manufactured using the hydrophobic semipermeable material.

The gas generator may further comprise a pressure sensor, a temperature sensor, a controller for regulating flow of the liquid reactant and a regulator to regulate flow of the gas.

A second aspect of the present invention provides a method of generating a gas. The method comprises providing a cartridge having a solid reactant and a liquid reactant distributor, the liquid reactant distributor comprising a plurality of normally closed holes, and supplying a liquid reactant to the liquid reactant distributor at a pressure above a predetermined fluid pressure to open the holes and disperse the liquid reactant for reaction with the solid reactant in the cartridge, thereby generating the gas.

The method may further comprise adjusting the pressure of the liquid reactant such that the liquid reactant is dispersed in a mist form for reaction with the solid reactant.

The predetermined fluid pressure may be between 2 to 10 bar, preferably 4 bar.

The step of providing the cartridge may comprise providing a cylinder and disposing the liquid reactant distributor substantially between two ends of the cartridge through a central axis of the cylinder.

The step of providing the cartridge may further comprise forming the plurality of normally closed holes around and along a length of the liquid reactant distributor.

The step of providing the cartridge may further comprise forming the liquid reactant distributor from a flexural material.

The flexural material may be selected from a group comprising elastomer, saturated rubbers, unsaturated rubbers, silicone rubber or a combination of these materials.

There is also disclosed a gas generator comprising a solid reactant cartridge containing at least a solid reactant for generating gas, a reactor configured to house the solid reactant cartridge, a tank for storing liquid reactant, a pump and a liquid conduit for conveying liquid reactant from the tank to the solid reactant cartridge housed within the reactor to induce a reaction of the solid reactant contained in the solid reactant cartridge, and a controller for regulating flow of the liquid reactant, and wherein a liquid distributor is preferably located in the centre of the solid reactant cartridge and is made of elastic materials with a plurality of holes on the sidewall. The plurality of holes is kept closed at normal pressure and they open only at certain high pressure to spray out liquid mist.

Preferably, the reactor has a chamber for collecting and buffering the gas generated from the solid reactant cartridge before the gas is released from the reactor.

Preferably, the reactor comprises a housing for receiving the solid reactant cartridge, the housing having an open end and a closed end, a lid for fastening to the open end of the housing and a barbed fitting located in the centre of the lid.

Preferably, the solid reactant cartridge comprises a main body for containing the solid reactant, a first cap disposed at one end of the main body and a second cap disposed at opposite end of the main body, a liquid distributor disposed within the main body; and a connector for connecting the liquid distributor to the first cap disposed at the one end of the main body.

Preferably, the solid reactant cartridge comprises a hydrophobic semipermeable material wrapped around the peripheral surface of the said cartridge, wherein the semipermeable material is configured to allow gas to pass through the material while preventing liquid or solid materials from passing through the material. In accordance with another embodiment of the invention, the main body of the solid reactant cartridge is made of hydrophobic material having a plurality of micro-pores.

Preferably, the barbed fitting of the reactor engages with the connector of the solid reactant cartridge and the liquid distributor to form a complete liquid flow channel when the lid of the reactor is fastened to the open end of the housing.

Preferably, a solid reactant cartridge is provided. The solid reactant cartridge comprises a main body for containing a solid reactant for generating gas, a first cap disposed at one end of the main body and a second cap disposed at opposite end of the main body, a liquid distributor having a plurality of holes and disposed within the main body, a connector for connecting the liquid distributor to the first cap disposed at the one end of the main body, and wherein the liquid distributor is made of elastic materials with a plurality of holes on the sidewall. The plurality of holes is kept closed at normal pressure and they open only at certain high pressure to spray out liquid mist.

Preferably, the liquid distributor is coupled to the connector preferably located in the centre of the first cap.

Preferably, the wall of the main body in the said solid reactant cartridge is made of flexible materials comprising at least a layer of felt and at least a layer of semipermeable membrane wrapping on the surface of the felt. In this case, it is possible to use only one cap disposed at one end of the main body. The liquid distributor is coupled to the connector located in the centre of the cap.

BRIEF DESCRIPTION OF DRAWINGS

Embodiments of the invention will be better understood and readily apparent to one of ordinary skill in the art from the following written description, by way of example only, and in conjunction with the drawings, in which:

FIG. 4A is a side view of a liquid distributor in accordance with one embodiment of the invention.

FIG. 4B is an end view of the liquid distributor shown in FIG. 4A.

FIG. 5A is a side view of an exemplary conventional liquid distributor.

FIG. 5B is an end view of the liquid distributor shown in FIG. 5A.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DESCRIPTION OF EMBODIMENTS

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention.

Embodiments of the present invention provide a gas generator that produces gas through reactions between at least a solid reactant and at least a liquid reactant. The liquid reactant and solid reactant are stored in a liquid reactant tank and a solid reactant cartridge, respectively. Once the liquid reactant is conveyed to the cartridge and mixed with the solid reactant, a gas generation reaction occurs with or without existence of catalyst. Depending on the gas to be produced, the compositions of the liquid reactant and solid reactant can be varied.

For example, in cases of hydrogen gas production, the solid reactant can be chosen from a group of active metal powder, metal hydride or their mixture, such as active aluminium, magnesium powder, iron powder, sodium borohydride, sodium aluminium hydride, lithium aluminium hydride; while the liquid reactant can be water or acid aqueous solution.

In another example, in the case of oxygen generation, the solid reactant can be percarbamide or sodium percarbonate and liquid reactant can be water. Catalysts can be added by mixing them with the solid reactant or liquid reactant.

In another example, in the case of carbon dioxide generation, the solid reactant can be metal carbonate, such as calcium carbonate, sodium carbonate and the liquid reactant can be diluted acid solution.

Figure 1:
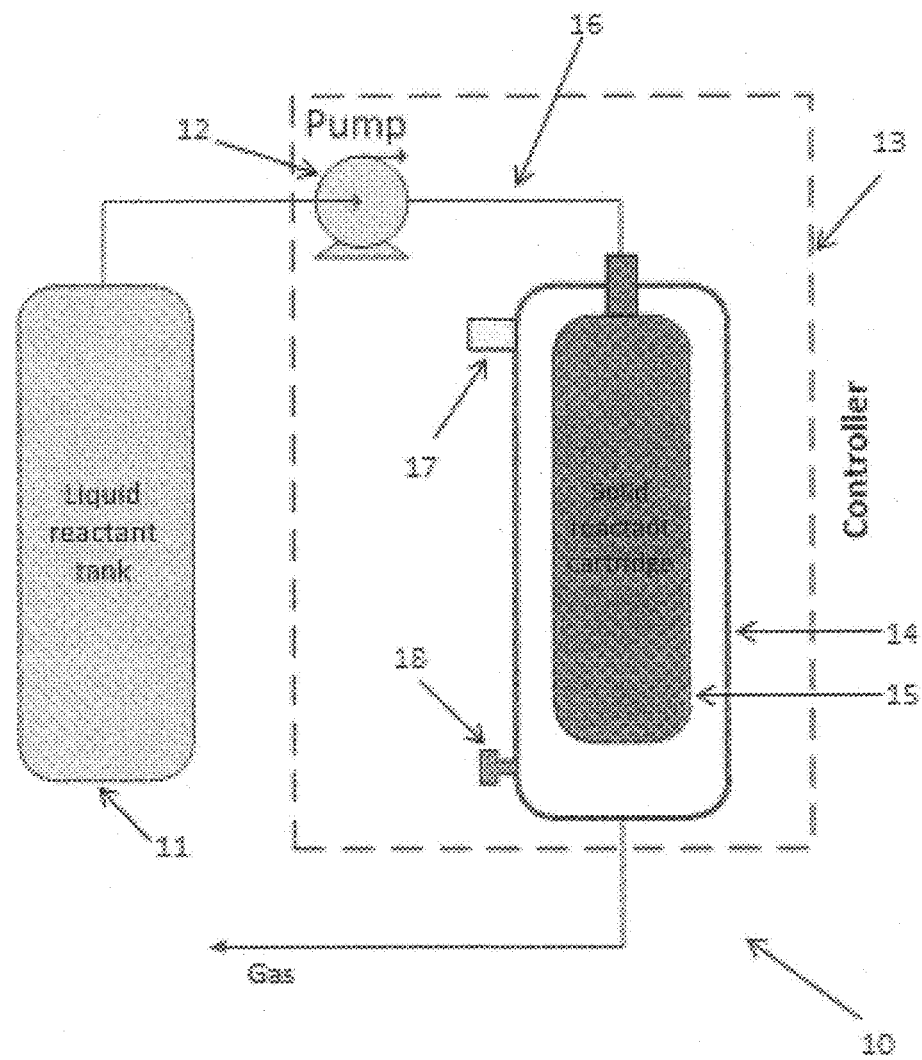
FIG. 1 is a schematic diagram of the gas generator with an electronic controller in accordance with an embodiment of the invention

FIG. 1 shows schematic diagram of the gas generator with an electronic controller in accordance with an embodiment of the invention. The gas generator 10 comprises a solid reactant cartridge 15 containing at least a solid reactant for gas generation, a reactor 14 configured to house the solid reactant cartridge 15, a tank 11 for storing liquid reactant, a pump 12 and a liquid conduit 16 for conveying liquid reactant from the tank 11 to the solid reactant cartridge 15 housed within the reactor 14 so as to induce a reaction with the solid reactant contained in the solid reactant cartridge 15, and a controller 13 for regulating flow of the liquid reactant.

An exemplary embodiment of the gas generator of the present invention may further comprise other supplementary parts, such as a pressure sensor 17 and a safety valve 18. In addition, the generator may also contain a coolant (not shown) attached to the side wall of the reactor 14, a temperature sensor (not shown) as well as a pressure regulator (not shown) to regulate the flow of the gas.

In an embodiment of the invention, the pressure sensor 17 and the temperature sensor are connected to the reactor 14 to collect data. The data collected may then be transmitted to the controller for controlling the pump 12, the coolant and the regulator in order to ensure a stable gas generation. The safety valve 18 is provided as a standby to release the pressure in the reactor 14 when a need arises. In alternate embodiments of the invention, the gas generator system of the present invention is portable.

In an exemplary embodiment, the liquid reactant from the liquid reactant tank 11 is delivered into the solid reactant cartridge 15 through a liquid conduit 16 by the pump 12. The solid reactant cartridge 15 which contains at least one solid reactant is located inside the chamber of the reactor 14. A buffer space is formed between the solid reactant cartridge 15 and the wall of the reactor 14. Gas generated from a reaction between the liquid reactant and solid reactant is collected and stored in the buffer space before it is conducted out for usage. The by-product from the reaction and other solid or liquid residuals are constrained in the solid reactant cartridge, and only the product gas can be released out from the wall of the solid reactant cartridge 15 due to a semi-permeable structure. The detailed structures of the solid reactant cartridge 15 and reactor 14 are described in the following paragraphs with the schematic drawings illustrated in FIG. 2A, 2B and FIG. 3.

Figure 2A:
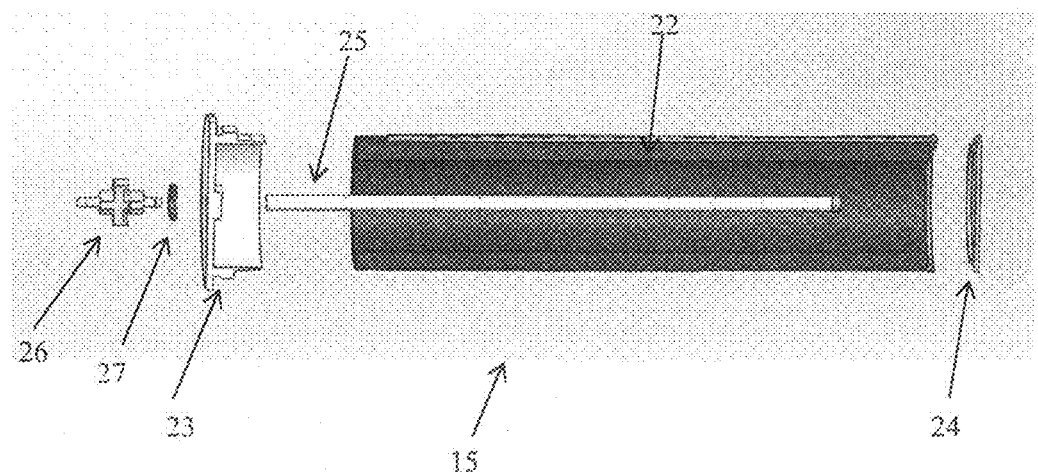
FIG. 2A is a cross-sectional view of the solid reactant cartridge in an open configuration in accordance with an embodiment of the invention.
Figure 2B:
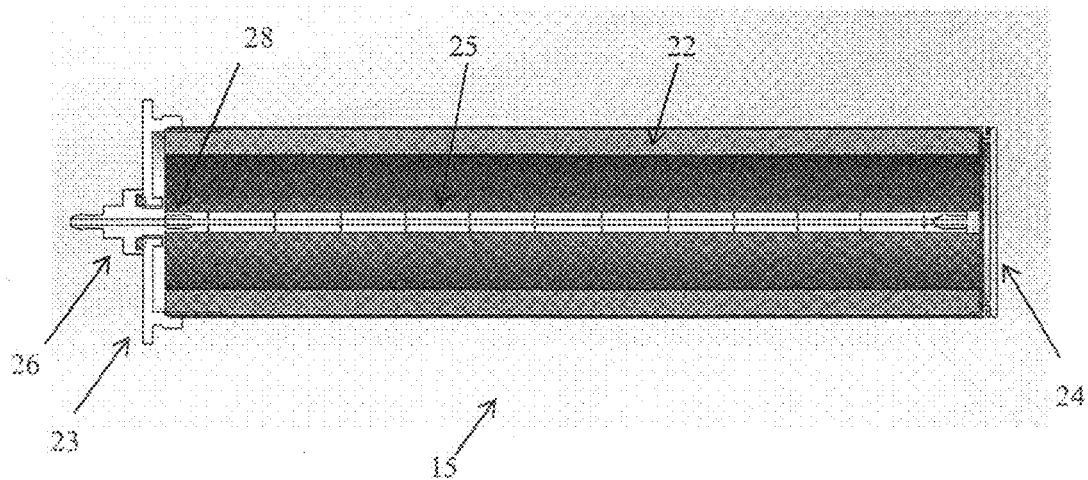
FIG. 2B is a cross-sectional view of the solid reactant cartridge in a closed configuration in accordance with an embodiment of the invention.

Referring now to FIG. 2A and FIG. 2B, a cross-sectional view of the solid reactant cartridge 15 in an open configuration and a close configuration are shown respectively, in accordance with an embodiment of the invention. According to the exemplary embodiment, the solid reactant cartridge 15 comprises a main body 22, a first end and an opposite end. In one embodiment of the invention, the first end and the opposite end of the solid reactant cartridge are open-ended. Each end has a rim for engaging with caps 23, 24. Each of the caps 23, 24 can be detachably coupled to each rim by any suitable means.

The cap 23 includes an aperture provided substantially in the centre of the cap for locating a barb connector 26 and an O-ring 27. The barb connector 26 comprises a nozzle on one side and a port on opposite side.

The solid reactant cartridge 15 further includes a liquid reactant distributor 25. The liquid reactant distributor 25 is disposed within the main body 22 of the solid reactant cartridge 15 and through the longitudinal length of the main body 22. The liquid reactant distributor 25 has a first distal end and a second distal end. The first distal end is configured to be detachably fitted to the nozzle of the barb connector 26. In one embodiment of the invention, the second distal end is closed-ended and it is disposed proximate the opposite end of the solid reactant cartridge 15. In another embodiment, the second distal end is open-ended. In this embodiment, the liquid reactant distributor 25 should have a length sufficiently the same as the main body 22 of the solid reactant cartridge 15 such that when the liquid reactant distributor 25 is assembled within the solid reactant cartridge 15, the cap 24 is able to cover the open-end of the second distal end of the liquid reactant distributor 25 in a reasonably tight manner. In yet another embodiment of the invention, the second distal end of the liquid reactant distributor 25 forms an integral part with the cap 24. This means that the liquid reactant distributor 25 extends from the cap 24 forming an integral unit.

Figure 3:
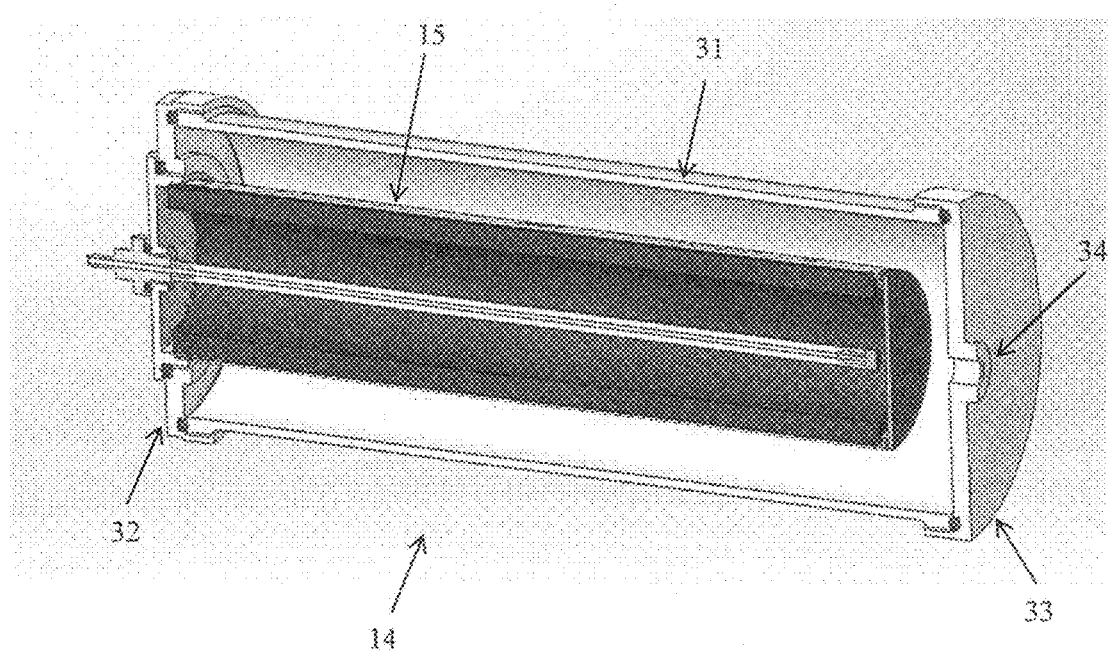
FIG. 3 is a cross-sectional view of the reactor in a closed configuration in accordance with an embodiment of the invention.

FIG. 3 shows a schematic side view of the reactor 14 of the present invention in a closed configuration. The reactor 14 comprises a hollow housing 31 and lids 32, 33. The housing 31 has an open end with lid 32 and a closed end with lid 33. A gas outlet 34 is provided substantially in the centre of the lid 33 for gas conduction. The solid reactant cartridge 15 is inserted into the hollow housing 31 and fastened to the centre of the lid 32.

In one embodiment of the invention, the reactor 14 has a length that is substantially the same as the length of the solid reactant cartridge 15. The reactor 14 has a diameter larger than the solid reactant cartridge 15 to provide sufficient space within the reactor 14 to allow sufficient pressure to build up within the reactor 14 during the gas generation reaction before the gas is released from the reactor 14 through the outlet 34. The diameters of the reactor 14 and the outlet 34, as well as the ratio of the diameters of the reactor 14 and the solid reactant cartridge 15, can be designed to align with the gas production capacity.

In another embodiment of the invention, as shown in FIG. 3, the reactor 14 has a length that is longer than the solid reactant cartridge 15 such that when the solid reactant cartridge 15 is inserted into the reactor 14, there is a space defining a chamber. The gas produced during the reaction can be collected and buffered into the chamber before the gas is released through the outlet 34. The chamber functions as a gas collector before the gas is released through the outlet 34 for use. The chamber also functions as a buffer compartment, which collects and accumulates the gas generated and hence, maintaining a certain pressure within the reactor 14 so as to stabilize the gas supply.

The reactor 14 can be of the same shape as the solid reactant cartridge 15 or of different shape. The reactor 14 can be made of the same material as the solid reactant cartridge 15 or of different material as the solid reactant cartridge 15.

Suitable materials include, but are not limited to, aluminium, stainless steel, polycarbonate, polyvinyl chloride, etc.

The solid reactant cartridge 15 which is filled with the solid reactant can be stored in a dry box or sealed in a moisture proof bag or a container before use. The solid reactant cartridge is disposable and can be installed into a gas generator on-site when gas supply is demanded.

Under appropriate pressure, mist is formed around the liquid reactant distributor 25. Gas generating reaction takes place in the solid reactant cartridge 15 almost instantaneously once the mist is in contact with the solid reactant contained within the solid reactant cartridge 15. Gas produced during the reaction then passes through the semipermeable main body 22 of the solid reactant cartridge 15 and into the reactor 14. The gas generated accumulates in the reactor 14 before the gas is released through the outlet 34 for application. In the present invention, the liquid reactant dispensed from the liquid reactant distributor 25 and/or the vapour produced by the reaction is constrained within the solid reactant cartridge 15 by the hydrophobic semipermeable main body 22. This allows continuous reaction to take place within the solid reactant cartridge 15, thus increases the efficiency of the reaction process. In the embodiment in which the reactor 14 has buffer chamber, pressure is built up inside the chamber before the gas is released for application through the outlet 34. The electronic controller is used to control the amount of liquid reactant supplied to the liquid reactant distributor 25 to control the amount of gas produces by the system.

FIGS. 4A & 4B show the side view and end view of a liquid reactant distributor 25 in accordance with one embodiment of the present invention. As comparison, side view and end view of an exemplary conventional liquid distributor 50 are shown in FIGS. 5A & 5B respectively.

Referring to FIGS. 4A & 4B, in one embodiment of the present invention, the liquid reactant distributor 25 comprises a hollow elastic tube 41 with a plurality of holes 42 distributed around the surface of the hollow elastic tube 41. The holes 42 can be formed by perforating the wall of elastic tube with a needle or other sharp points. The diameter of the needle used can be in the region from 50 μm to 2 mm. The holes 42 of the elastic tube 41 formed are therefore normally closed. The elastic tube has one open end to fluidly connect with barb connector 26 and another end closed. Alternatively, the elastic tube 41 is open in both ends, one fluidly connected with barb connector 26 and the other connected or sealed at the opposite cap 24. Materials of the elastic tube 41 can be selected from saturated and/or unsaturated rubbers. The rubbers may include, but are not limited to rubbers such as silicone rubber, and fluoroelastomers. The material of the elastic tube 41 and the diameter of the plurality of holes advantageously allow the plurality of holes 42 which are normally closed to open when pressure within the elastic tube 41 reaches a predetermined level. In alternate embodiments, the material of the elastic tube 41 may have a tensile strength of between 8-14 MPa, and the tensile modulus of the material at 200% elongation may be between 1-2.8 MPa. Preferably, the tensile strength of the elastic tube 41 may be 10 MPa, and the tensile modulus of the elastic tube 41 at 200% elongation may be 1.9 MPa.

The normally closed holes 42 open only at the predetermined pressure. The predetermined pressure may be in the range of 2-10 bar depending on the elastic material used. When the liquid reactant is pumped into the liquid reactant distributor 25, pressure is built up inside the elastic tube 41 as the liquid reactant is kept within the elastic tube 41. Once the pressure within the elastic tube 41 reaches the predetermined level, the plurality of holes 42 open and the reactant liquid is dispersed in a mist form. In some embodiments, the predetermined pressure can be 4 bar.

In other words, the normally closed holes 42 can open at a specific pressure value and disperse the liquid reactant in mist form into the cartridge. The high surface-to-volume ratio of the reactant liquid in mist form can advantageously enhance reaction speed and increase efficiency of gas generation. The pressure within the elastic tube 41 falls when the pump 12 is switched off. The plurality of holes 42 will close due to the reduction in pressure and end the reactant distribution process. Therefore, the reaction process can be stopped within reasonable time after suspension of reactant delivery. The closure of the plurality of holes 42 also advantageously prevents undesirable backflow of reaction by-products within the solid reactant cartridge 15 into the elastic tube 41.

As shown in FIG. 4B, the elastic tube 41 has a thick wall. The wall thickness of the elastic tube shown in FIG. 4B is 1.35 mm. The elastic tube has an outer diameter of 3.5 mm. In other words, the elastic tube has an outer diameter to inner diameter (OD/ID) ratio of 35:8. It will be appreciated that the OD/ID ratio may range from 10:1 to 2:1, and the wall thickness may range from 0.5 mm to 2.5 mm.

In contrast, a conventional liquid distributor 50 (as shown in FIG. 5A) is made of solid tube 51 with a plurality of through holes 52 distributed around the surface of the tube 51. The material used for the solid tube 51 is inelastic, and the through holes 52 are normally open. Generally, the wall thickness of the solid tube 51 is relative low as indicated by the low OD/ID ratio of 10:9 (as shown in FIG. 5B).

In conventional liquid distributor design, the through holes 52 are formed around the surface of solid tube 50. There is no pressure built up inside the solid tube 50 due to the normally open through holes 52. Consequently, the reactant liquid is dispensed in form of large droplets. The low surface-to-volume ratio of the large droplets reduces the reaction speed and gas generation efficiency. When the pump 12 is switched off, the residual liquid reactant in the liquid conduit 16 of the downstream side of the pump 12 and in the liquid distributor 50 can still flow into the solid reactant cartridge 15 due to the normally open through holes 52. Therefore, the cessation of the reaction obviously lags the shutdown of the pump 12. The by-products of the reaction may also backflow into the solid tube 50 through the open holes 52. Consequently, the overall controllability of the gas generation is less effective as compared to the present invention.

Figure 6:
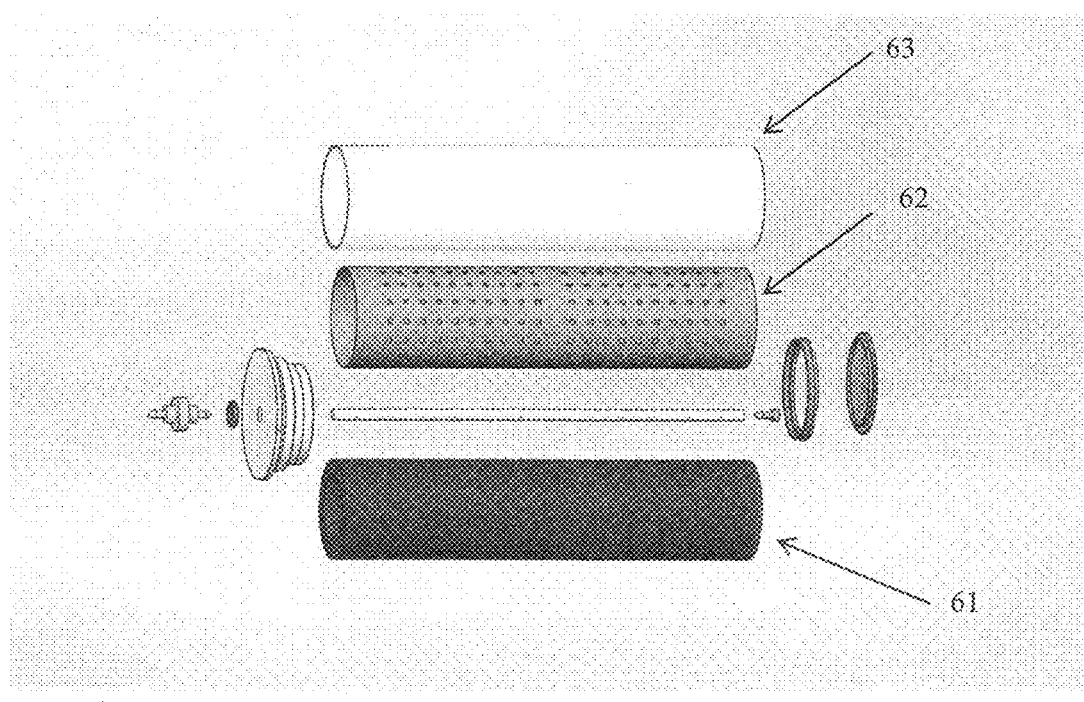
FIG. 6 is a schematic view of the main body of the solid reactant cartridge in accordance with an embodiment of the invention.

FIG. 6 is a schematic view of the main body 22 of the solid reactant cartridge 15 in accordance with an embodiment of the invention. The main body 22 is made of three layers of different materials, the felt 61, the solid cylinder 62 and the semipermeable membrane 63.

The solid cylinder 62 is made of metal or plastic and conforms to the shape of the main body 22. Felt 61 is inserted within the solid cylinder 62 as lining and semipermeable membrane 63 is wrapped around the surface of the solid cylinder 62. A plurality of through holes is formed on the wall of the solid cylinder 62 for passage of the gas. The felt 61 can be made of carbon, glass or metal. The functions of the felt 61 include constraining the reaction byproduct within the solid reactant cartridge 15 and also filtering the gas produced. The semipermeable membrane 63 may be selected from hydrophobic materials which only allow gas to pass through. The hydrophobic materials may include, but are not limited to polytetrafluoroethylene, otherwise known by its commercial name, Teflon.

In an embodiment of the invention, the solid reactant cartridge 15 is further provided with a semipermeable material 63 that wraps the peripheral surface of the main body 22 of the solid reactant cartridge 15. The semipermeable material 63 should be porous with hydrophobic properties such that it allows gas to pass through but not liquid, vapour or solid materials. When the solid reactant cartridge 15 is in use, liquid reactant is delivered through the liquid reactant distributor 25. As the liquid travels through the longitudinal body of the liquid reactant distributor 15, it sprays out into the solid reactant cartridge 15.

The gas generated within the reactant cartridge 15 passes through the semipermeable material 63 and is collected. The liquid reactant which is dispensed from the liquid reactant distributor 25 into the solid reactant cartridge, is constrained within the solid reactant cartridge 15 for continuous reaction to take place. Any suitable semipermeable material which exhibits such semi-permeability may be used without departing from the scope of the invention. In one embodiment of the invention, the semipermeable material is a gas permeable membrane. Preferably, the semipermeable material is a kind of Teflon membrane. More preferably, the semipermeable material is a polytetrafluoroethylene (PTFE) membrane. In another embodiment, the wall of the main body 22 is fabricated as semipermeable. In other words, the wall is made of hydrophobic material and with micro pores on it. The wall may be additively manufactured using the hydrophobic material. For instance, the wall can be formed by using a 3D printing technique using the hydrophobic material. The micro-pores can be formed naturally during deposition of the hydrophobic material. The micro-pores may have a diameter of between 0.03 µm to 2 µm.

Alternatively, in another embodiment the solid cylinder 62 is omitted. The main body 22 of the solid reactant cartridge 15 is made by wrapping semipermeable membrane 63 directly on the surface of the felt 61. Optionally, the solid cylinder 62 is replaced with layer of flexible materials with through holes on it. In both cases, the solid reactant cartridge 15 is more flexible for installation and the volume and cost can be cut down.

In yet another embodiment, the solid reactant cartridge 15 is open in one end to connect with cap 23 and closed in the opposite end.

The gas generator of the present invention has several advantages. As described hereinabove, an uninterrupted reaction can be achieved in the present invention since both the reactants and by-product are constrained within the cartridge. The semipermeable material provided around the peripheral surface of the solid reactant cartridge separates the gas generated by the reaction from the reactants and helps to constrain the reactants and the by-product inside the solid reactant cartridge. This helps to avoid the problems induced by the by-product. The amount of liquid delivered to the reactor can be controlled precisely by the pump and the controller. As such, a quick response can be achieved in the system since gas can be produced almost instantaneously once the liquid reactant is in contact with the solid reactant.

The liquid reactant distributor with a plurality of normally closed holes is advantageously configured to open at a predetermined pressure, such that the liquid reactant can be sprayed out in a mist form instead of large droplets. The reaction speed and gas generation efficiency are beneficially improved due to the high surface-to-volume ratio of the mist. As the plurality of holes close when the pressure within the liquid reactant distributor falls below the predetermined value, the present invention can beneficially limit undesirable side reactions that may occur due to backflow of by-products into the reactant distributor. In addition, the reaction can be stopped within reasonable time once the pump is switched off since the spraying is cut off promptly with the pressure drop that close the plurality of holes. The overall controllability of the gas generation is advantageously improved in the present invention. Factors which determine the pressure at which the normally closed holes open can include, but is not limited to: the outer-to-inner-diameter ratio of the liquid reactant distributor, the material of the liquid reactant distributor, the nature of the liquid reactant and the wall thickness of liquid reactant distributor.

The system of the present invention also allows reaction to take place efficiently as liquid reactant is dispensed along the whole length of the liquid reactant distributor 25. The dispersed liquid reactant reacts with the solid reactant contained within the cartridge almost instantaneously and the dispersion allows reaction to take place uniformly in the whole length of the cartridge. The reactor of the present invention is orientation-proof. In other words, the reactor is orientation-independent and is capable of being operated when placed in any position, be it in a vertical, horizontal or an aslant position. Constant and stable generation of gas can be obtained no matter how the reactor is positioned as the liquid reactant is sprayed out under a predetermined pressure and thus can reach the whole surrounding area. This feature is especially important for outdoor application. The system also allows a user to control the amount of gas produced by system by controlling the amount of liquid reactant supplied to the system. The system thus has the advantage of producing gas on demand. The new design of the solid reactant cartridge is made by wrapping semipermeable membrane directly on the felt or with a layer of flexible layer in between, eliminating the conventional layer of solid cylinder. Thus the solid reactant cartridge is flexible in configuration and volume, making it easier to install and cheaper.

The solid reactant cartridge of the present invention is disposable and it can be easily replaced with a new one once the gas flow rate or pressure is lower than a pre-set range. The by-product produced within the solid reactant cartridge can be recycled for other use.

Figure 7:
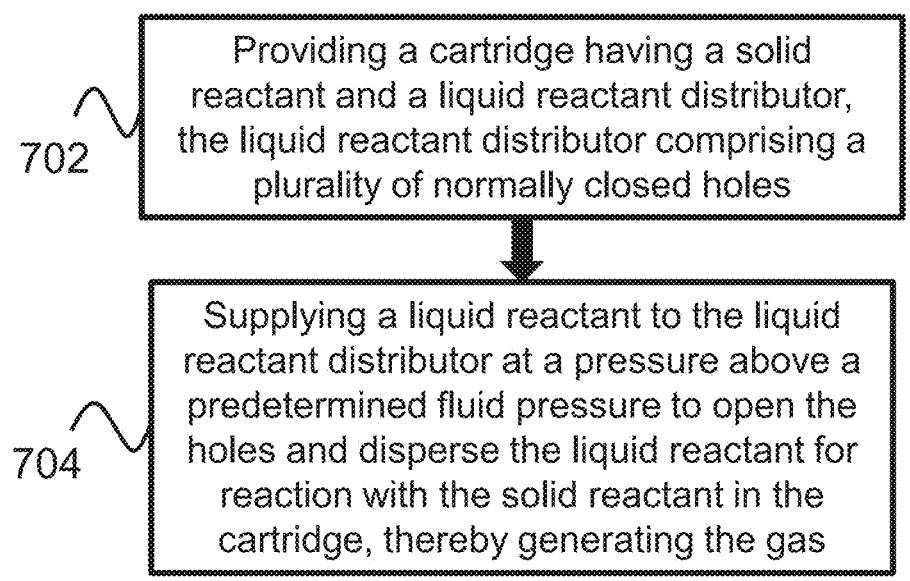
FIG. 7 shows a flowchart illustrating a method of generating a gas according to an example embodiment.

FIG. 7 shows a flowchart illustrating a method of generating a gas according to an example embodiment. At step 702, a cartridge having a solid reactant and a liquid reactant distributor is provided. The liquid reactant distributor comprises a plurality of normally closed holes. At step 704, liquid reactant is supplied to the liquid reactant distributor at a pressure above a predetermined fluid pressure to open the holes and disperse the liquid reactant for reaction with the solid reactant in the cartridge, thereby generating the gas.

The present invention relates to a compact gas generator. The generator comprises a solid reactant cartridge containing the solid reactant, a reactor configured to house the solid reactant cartridge, a tank for storing liquid, a pump and a liquid conduit for conveying liquid reactant from the tank to the solid reactant cartridge housed within the reactor to induce a gas generating reaction and a controller for regulating flow of the liquid reactant. The controllability of the generator is obviously improved by providing a novel designed liquid reactant distributor with normal closed holes that ensure liquid spraying in mist instead of droplet and also cut off spraying promptly once the pump is switched off. The generator is also featured in a flexible solid reactant cartridge design which not only makes the replacement of the cartridge easier also cuts the cost by simplify the structure.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A gas generator comprising:
   a cartridge having a solid reactant and a liquid reactant distributor provided therein; and
   a liquid reactant supply in fluid communication with the liquid reactant distributor and configured to provide a liquid reactant under pressure to the liquid reactant distributor;
   wherein the liquid reactant distributor comprises an elastic tube of an elastic material, the liquid reactant distributor having an outer diameter and an inner diameter and a plurality of holes along its length, wherein a wall thickness of the liquid reactant distributor is defined by a ratio of the outer diameter to the inner diameter, wherein the elastic material, the wall thickness and a diameter of the holes (hole diameter) are configured such that the plurality of holes are closed when the liquid reactant distributor is below a predetermined fluid pressure and are opened when the liquid reactant distributor is at or above the predetermined fluid pressure to disperse the liquid reactant for reaction with the solid reactant in the cartridge.

2. The gas generator of claim 1, wherein the plurality of holes are configured to disperse the liquid reactant in a mist form under a pressure above the predetermined fluid pressure.

3. The gas reactor of claim 1, wherein the plurality of holes are configured such that they are opened at the predetermined fluid pressure of between 2 to 10 bar, preferably 4 bar.

4. The gas generator of claim 1, wherein the cartridge comprises a cylinder and the liquid reactant distributor runs between two ends of the cartridge through a central axis of the cylinder.

5. The gas generator of claim 1, wherein the plurality of holes are distributed around the length of the liquid reactant distributor.

6. The gas generator of claim 1, wherein the elastic material is selected from a group comprising elastomer, saturated rubbers, unsaturated rubbers, silicone rubber or a combination of these materials.

7. The gas generator of claim 1, wherein the ratio of the outer diameter to the inner diameter of the liquid reactant distributor is between about 10:1 to 2:1.

8. The gas generator of claim 1, further comprising a reactor configured to house the cartridge.

9. The gas generator of claim 8, wherein the reactor defines a chamber for collecting and buffering gas generated in the cartridge.

10. The gas generator of claim 8, wherein the reactor comprises a housing for receiving the cartridge, the housing having an open end and a closed end, a lid for fastening to the open end of the housing and a barbed fitting located in the center of the lid.

11. The gas generator of claim 1, wherein the cartridge comprises a hydrophobic semipermeable material wrapped around a peripheral surface of the cartridge, wherein the hydrophobic semipermeable material is configured to allow gas to pass through the material while preventing liquid or solid materials from passing through the material.

12. The gas generator of claim 11, wherein the hydrophobic semipermeable material comprises a plurality of micro-pores, each of the plurality of micro-pores comprising a diameter of between 0.03 µm to 2 µm.

13. The gas generator of claim 1, wherein a wall of the cartridge comprises a hydrophobic semipermeable material, wherein the hydrophobic semipermeable material is configured to allow gas to pass through the material while preventing liquid or solid materials from passing through the material.

14. The gas generator of claim 1, further comprising a pressure sensor, a temperature sensor, a controller for regulating flow of the liquid reactant and a regulator to regulate flow of the gas.

15. The gas generator of claim 1, wherein the wall thickness of the liquid reactant distributor is between about 0.5 mm and 2.5 mm.

* * * * *